United States Patent [19]

Kamio et al.

[11] Patent Number: 5,202,844
[45] Date of Patent: Apr. 13, 1993

[54] COMPUTER HAVING INTEGRAL TYPE HAND WRITING INPUT/DISPLAY DEVICE AND KEYBOARD

[75] Inventors: Shizuo Kamio; Fumitaka Sato; Shimpei Kunii; Masayoshi Murayama, all of Tokyo, Japan

[73] Assignee: Kabushiki Kaisha Toshiba, Kawasaki, Japan

[21] Appl. No.: 702,810

[22] Filed: May 21, 1991

[30] Foreign Application Priority Data

May 22, 1990 [JP] Japan .................................. 2-130361
May 22, 1990 [JP] Japan .................................. 2-130363
Jun. 8, 1990 [JP] Japan .................................. 2-150461
Aug. 30, 1990 [JP] Japan .................................. 2-228653

[51] Int. Cl.⁵ .................................................. G06F 3/00
[52] U.S. Cl. .................................................. 364/709.11
[58] Field of Search ............... 364/708, 709.11, 709.10, 364/709.12, 709.01

[56] References Cited

U.S. PATENT DOCUMENTS 5,001,659  3/1991  Watabe ................................. 364/708
5,057,676 10/1991  Komaki ................................. 364/708

FOREIGN PATENT DOCUMENTS 0404156 12/1990  European Pat. Off. .
3511353 10/1986  Fed. Rep. of Germany .
2544103 10/1984  France .

OTHER PUBLICATIONS

Patent Abstracts of Japan, vol. 9, No. 13 (P-328) (1736), Jan. 19, 1985, for JP-A-59160226 (Fuji), published Sep. 10, 1984.
Japanese Utility Model Application No. 61-131356, S. Kunii, Filed Aug. 29, 1986, Corresponding to Japanese Utility Model Disclosure (Koaki) No. 63-39731.
Kazuyoshi Koga et al., "Development and Evaluation of an Input Integrated Flat Panel Display," The Paper Journal of Information Processing Society of Japan, vol. 27, No. 6, Jun. 1986.

Primary Examiner—Long T. Nguyen
Attorney, Agent, or Firm—Finnegan, Henderson, Farabow, Garrett & Dunner

[57] ABSTRACT

An information processing apparatus includes a hinge mechanism for rotating an integral type hand writing input/display device and a keyboard from a position, in which the display surface of the integral type hand writing input/display device and the surface of the keyboard face each other, to a position of a desired opening angle. The input/display device is provided on a top portion of a processing apparatus body, is constituted by integrally superposing a tablet device for coordinate input on a display surface of a display device, and inputs coordinate data representing a location indicated voluntarily on the tablet device. The hinge mechanism can retain the desired opening angle. There are further provided an attitude sensor for detecting which of the integral type hand write input/display device and the keyboard is situated substantially horizontally, and a changing circuit for changing the display contents of the integral type hand write input/display device and coordinate data detection location, in accordance with the ON/OFF state of the attitude sensor.

10 Claims, 18 Drawing Sheets

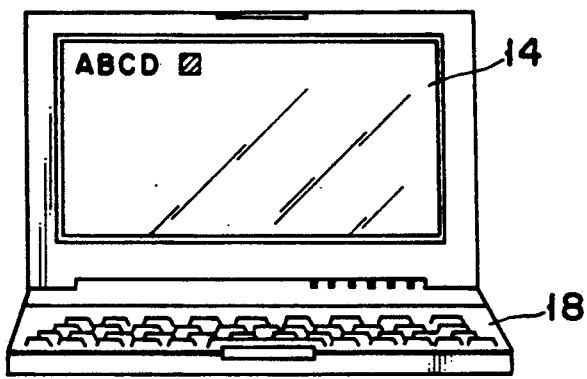
F I G. 13
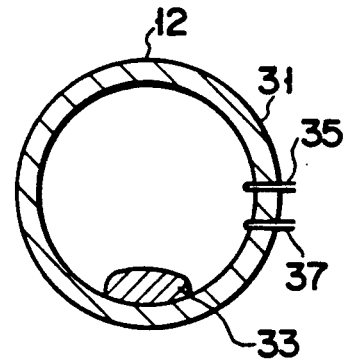
F I G. 14
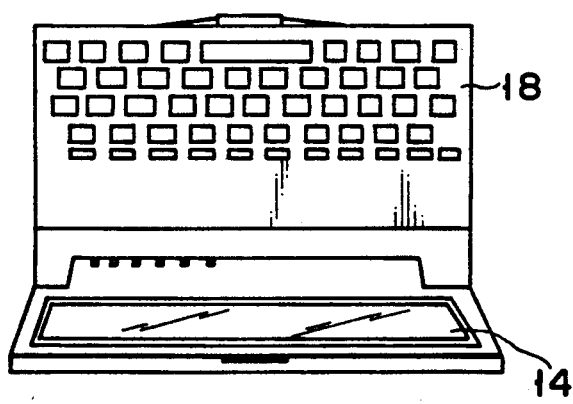
F I G. 15
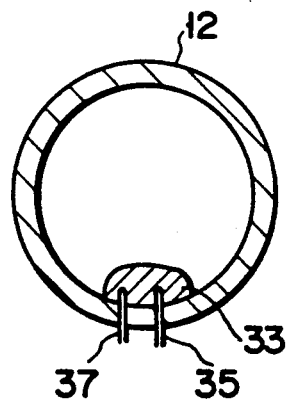
F I G. 16

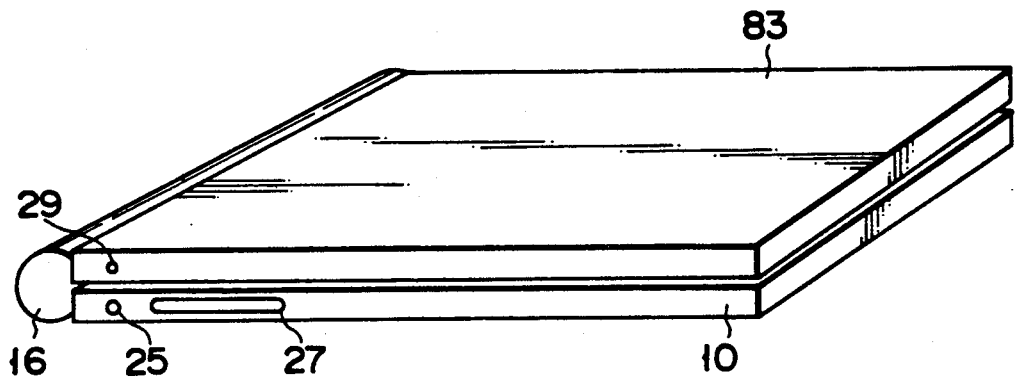
F I G. 21
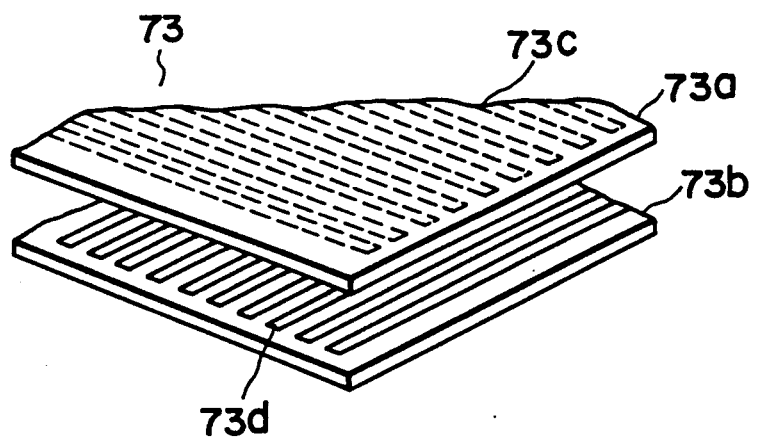
F I G. 22

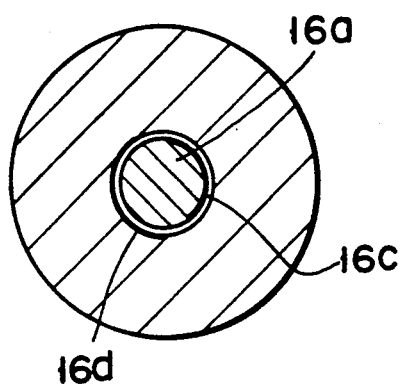
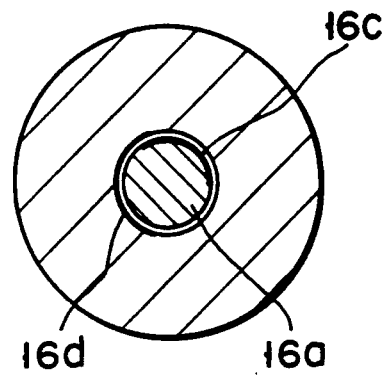
FIG. 26   FIG. 27
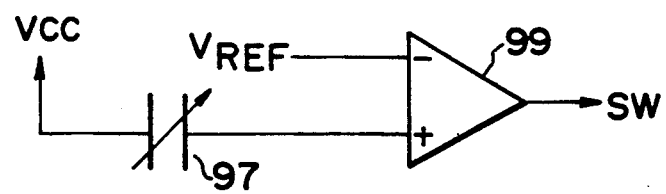
FIG. 28

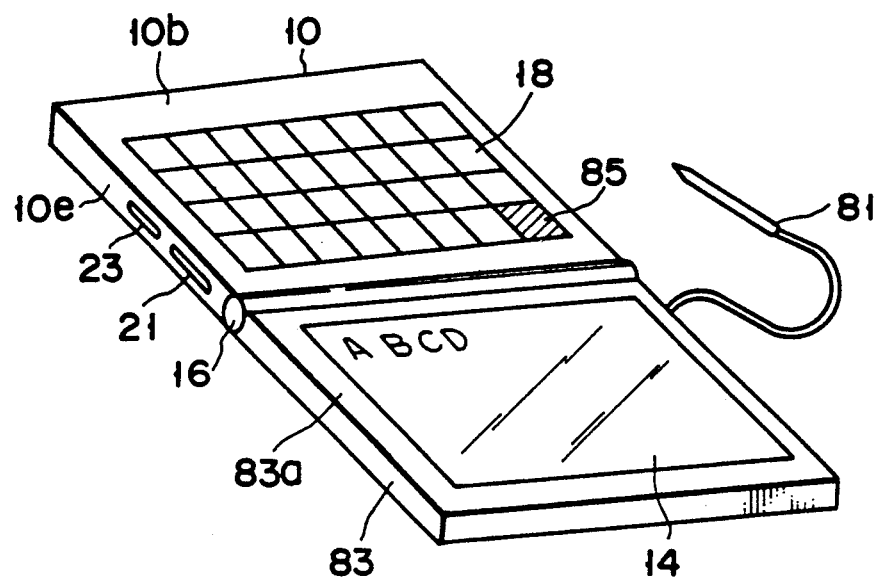
F I G. 29
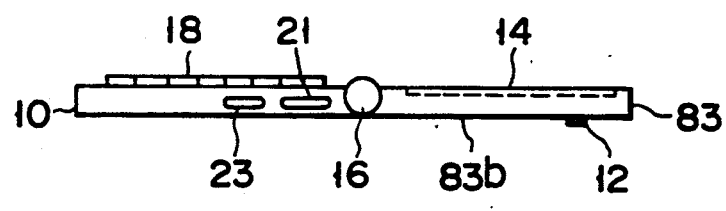
F I G. 30

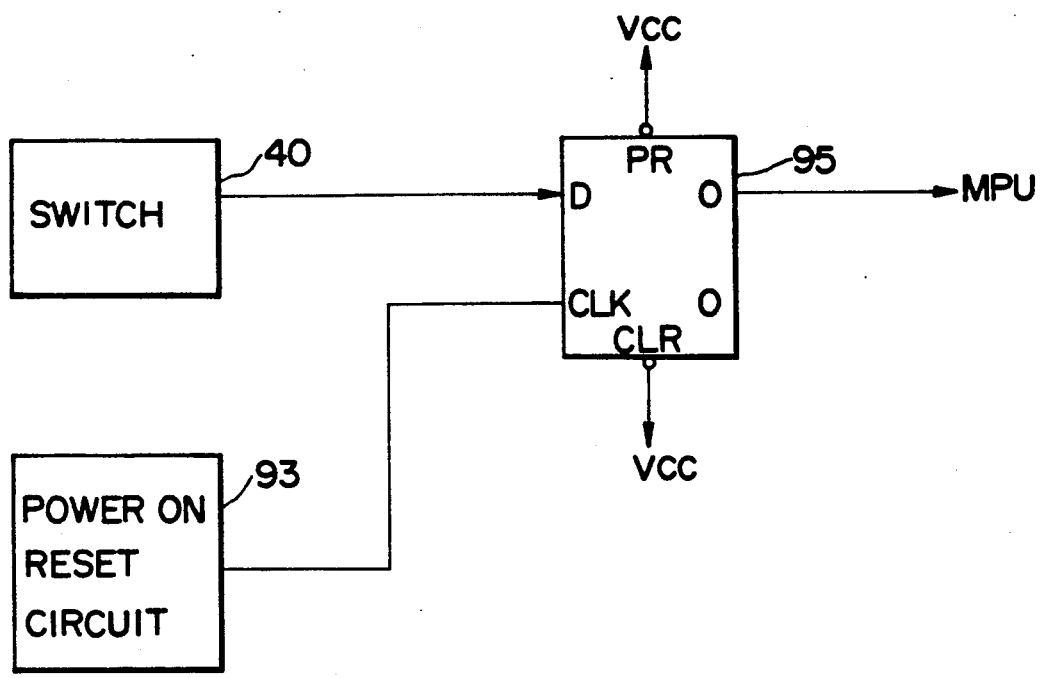
F I G. 33

COMPUTER HAVING INTEGRAL TYPE HAND WRITING INPUT/DISPLAY DEVICE AND KEYBOARD

BACKGROUND OF THE INVENTION

1. Field of the Invention

The present invention relates to a computer having an integral type hand writing input/display device and a keyboard.

2. Description of the Related Art

Conventionally, a work station or a personal computer comprises a display and a keyboard. A mouse, etc. are used as a pointing device.

Recently, an integral type hand writing input/display device, which has transparent tablets for coordinate data superimposed input on a liquid-crystal display, has been developed and has attracted considerable attention. The integral type hand writing input/display device does not employ an indirect process in which a cursor is moved by means of a mouse to point an object on the display. By contrast, in this device, an object on the liquid-crystal display can be pointed directly. When a character, sign or line is written by hand, the written image is displayed at the location of the hand writing, as if the character, etc. were written on a paper sheet by means of a pencil. Thus, the device is very easy to operate.

FIG. 1 shows a conventional work station employing such an integral type hand writing input/display device. In the work station 1, an integral type hand write input/display device 3 is used as a main man/machine interface. A keyboard may not be provided or a keyboard 5 may be selectively provided as an additional device.

Since an information processor such as a work station employing the integral type hand writing input/display device requires no skill in its operations; anyone can operate it easily. However, for example, when a large amount of character text is input, a person who is accustomed to keyboard operations can input data more efficiently with a keyboard than with the integral type hand writing input/display device. In an information processor using the integral type hand writing input/display device however, a keyboard generally is not provided. Thus, data input must be carried out by an inefficient method.

Where a keyboard is provided for data input, the apparatus (i.e. the integral type hand writing input/display device and keyboard) occupies a considerable area on the desk, as shown in FIG. 1. In addition, since the keyboard is connected as an additional device, it is inconvenient to carry the apparatus.

SUMMARY OF THE INVENTION

The object of the present invention is to provide a computer having a keyboard and an integral type hand writing input/display device, which computer is easy to carry and occupies a small area on a desk when in use.

According to a first aspect of the invention, there is provided an information processing apparatus comprising: an integral type hand writing input/display device, a tablet device for coordinate input integrally superimposed on a display device, for inputting coordinate data representing a location indicated on the tablet device; a keyboard; a rotary support mechanism, provided on the top portion of an apparatus body, for rotating said integral type hand writing input/display device and said keyboard from a position, in which a display input surface of the integral type hand writing input/display device and a surface of the keyboard face each other, to a position of a desired opening angle, and for keeping the opening angle; attitude detecting means for detecting an attitude of the apparatus body, in accordance with an installation state of the apparatus body; and changing means for changing the display contents and coordinate data detection location of the integral type hand writing input/display device, in accordance with the detection result of the attitude detecting means.

According to a second aspect of the invention, there is provided an information processing apparatus comprising: an integral type hand writing input/display device, having a tablet device for coordinate input integrally superimposed on a display device, for inputting coordinate data representing a location indicated voluntarily on the tablet device; a keyboard; a rotary support mechanism for rotating said integral type hand writing input/display device and said keyboard from a position, in which a display input surface of the integral type hand writing input/display device and a surface of the keyboard face each other, to a position of a desired opening angle; an opening angle detecting means for detecting the opening angle of the rotary support mechanism; and changing means for changing the display contents of the display device and coordinate data detection location of the integral type hand writing input/display device in accordance with the detection result of the opening angle detecting means.

According to a third aspect of the invention, there is provided an information processing apparatus comprising: an integral type hand writing input/display device, having a tablet device for coordinate input integrally superimposed on a display device, for inputting coordinate data representing a location indicated voluntarily on the tablet device; a keyboard; a rotary support mechanism for rotating said integral type hand writing input/display device and said keyboard from a position, in which a display input surface of the integral type hand writing input/display device and a surface of the keyboard face each other, to a position of a desired opening angle; commanding means for commanding a change of a display contents of the display device and coordinate data detection location in the integral type hand writing input/display device; and changing means for changing the display contents of the display device and coordinate data detection location, in response to a command from the commanding means.

According to a fourth aspect of the invention, there is provided an information processing apparatus comprising: an integral type hand writing input/display device, having a tablet device for coordinate input integrally superimposed on a display device, for inputting coordinate data representing a location indicated voluntarily on the tablet device; a keyboard; a rotary support mechanism for rotating said integral type hand writing input/display device and said keyboard from a position, in which a display input surface of the integral type hand writing input/display device and a surface of the keyboard face each other to a position of a desired opening angle; attitude detecting means for detecting the attitude of an apparatus body, in accordance with the installation state of the apparatus body; commanding means for commanding a change of a display contents of the display device and coordinate data detection location in the integral type hand writing input/display device; and direction determining means for determining the direction of the display contents of the integral type hand writing input/display device and coordinate data detection location, in accordance with the detection result obtained by the state detecting means.

According to the above-described structures, data can be input by means of either the integral type hand writing input/display device or the keyboard, in accordance with the processing to be performed.

The integral type hand writing input/display device is provided on the processing apparatus body, and the keyboard can be held over desired angles ranging from a closed position in which the keyboard faces the surface of the input/display device to a position of a desired opening angle. Thus, when data is input mainly by the integral type hand writing input/display device, the keyboard can be supported at an angle to a horizontal plane when the processing apparatus body is situated substantially horizontal, so that smooth hand writing input can be performed. On the other hand, when data is input mainly by the keyboard, the input/display device can be supported at an angle to a horizontal plane when the keyboard is situated substantially horizontal (with a predetermined angle), so that the display surface may be easily recognized.

The device detects which of the integral type hand writing input/display device and the keyboard is situated substantially horizontally for use in data input. On the basis of the detection result, the display contents and coordinate data detection location in the input/display device is changed. Thus, the apparatus can be operated easily.

According to the present invention, data can be input by either the integral type hand writing input/display device or the keyboard. Thus, it is not necessary to connect a keyboard to the information processing apparatus having the integral hand writing input/display device. In the case where both the input/display device and the keyboard need to be used, the area on the desk for the installation of the apparatus is small. The keyboard is coupled by a rotary support mechanism and is held to face the display surface of the integral type hand writing input/display device at the time of non-use. Therefore the apparatus can be carried easily.

Furthermore, it is internally detected which of the integral type hand writing input/display device and the keyboard is mainly used for data input, when the processing apparatus body is situated in a predetermined state. In accordance with the detection result, the display contents and coordinate data detection location of the input/display device are changed.

The integral type hand writing input/display device and the keyboard are held at a desired opening angle by means of the rotary support mechanism. The opening angle of the input/display device and keyboard is detected by the angle detecting means, thereby changing the display contents. Specifically, when data is input by using the input/display device, the keyboard that is not used is turned down and the opening angle is set at approximately 180°. When data is input by using the keyboard, the input/display device is held at such an angle that the display plane can be easily seen. Depending on the state of the apparatus, the display contents are changed and vertically inverted. When the input/display device is used, the apparatus is installed such that the input/display device is situated on the user's side. On the other hand, when the keyboard is used, it is situated on the user's side. The display contents are changed in accordance with the direction of the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 13 is a front view of a second embodiment of the work station in the keyboard input mode;

FIG. 14 the state of an attitude sensor in the second embodiment when the work station is in the position shown in FIG. 13;

FIG. 15 is a front view of the second embodiment showing the work station in the hand writing input mode;

FIG. 16 the state of the attitude sensor of the second embodiment when the work station is in the position shown in FIG. 15;

FIG. 21 shows the state in which the keyboard and the integral type hand writing input/display device are superimposed on each other;

FIG. 22 is a view for explaining transparent tablets of the third embodiment;

FIGS. 26 and 27 are views for explaining an opening angle detecting mechanism of the third embodiment;

FIG. 28 is a view showing a modification of the opening angle detecting mechanism of the third embodiment;

FIG. 29 shows the installation state of the work station in the hand write input mode of a fourth embodiment;

FIG. 30 a side view of the work station shown in FIG. 29;

FIG. 33 is a block diagram showing an example of the structure of a switch signal determining circuit.

DETAILED DESCRIPTION OF THE PREFERRED EMBODIMENTS

An embodiment of the present invention will now be described with reference to the accompanying drawings.

Figure 1:
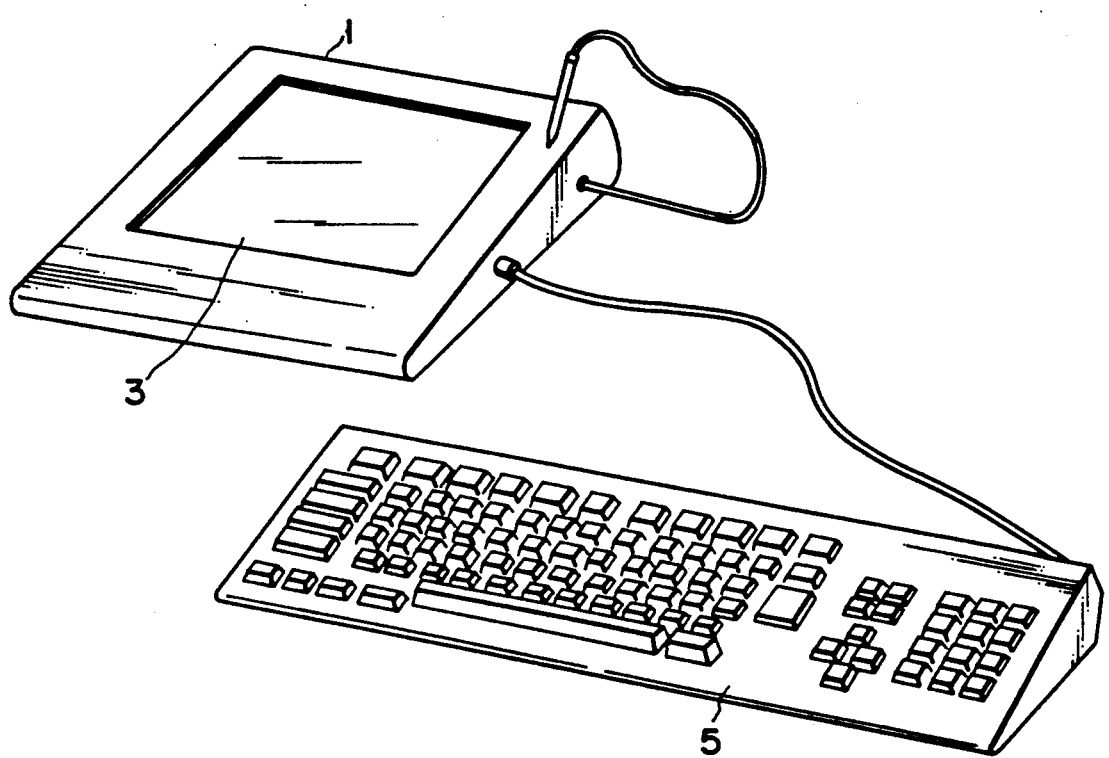
FIG. 1 shows an example of arrangement of a conventional computer on a desk, which has an integral type hand writing input/display device and to which a keyboard is connected.
Figure 2:
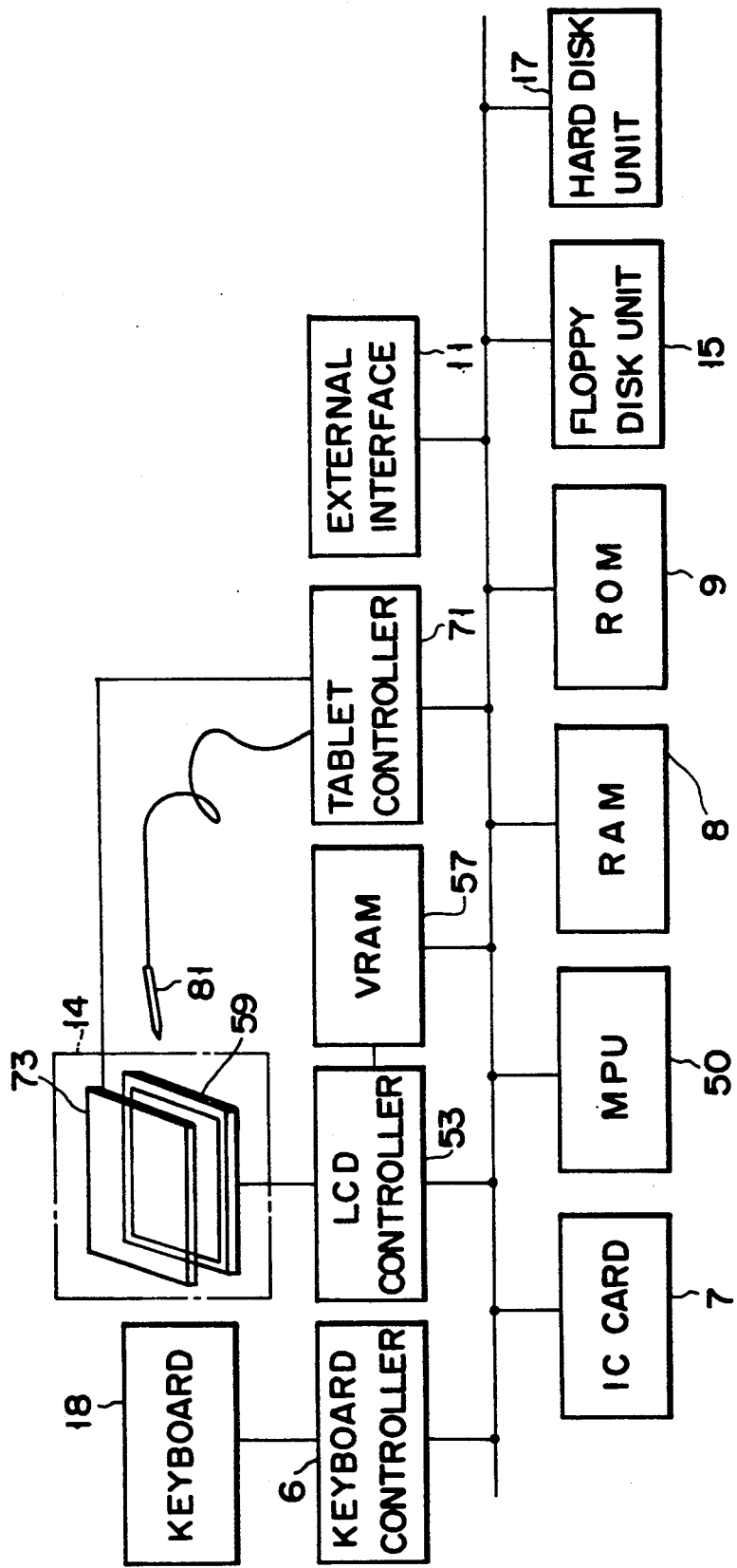
FIG. 2 is a system block diagram of a computer having an integral type hand writing input/display device and keyboard according to the present invention.

FIG. 2 is a system block diagram of a computer having an integral type hand writing input/display device and a keyboard according to the present invention.

As shown in FIG. 2, the computer of this embodiment comprises a keyboard 18 for inputting data, a keyboard controller 6 for controlling the keyboard 18, an integrated display/input device 14 integrated by overlaying an input tablet 73 on a liquid crystal display (LCD) 59, an LCD controller 53 for controlling the LCD 59, a tablet controller 71 for controlling the tablet 73, a stylus pen 81 for inputting coordinate data on the tablet 73, an external interface 11 such as an RS-232C interpose, for interfacing with optionally connected external equipment, an IC card 7, a random access memory (RAM) 8 for storing data and programs, a read only memory (ROM) 9 for storing a system program, and for storing standard patterns and dictionaries used for recognizing characters input by handwriting, a floppy disk unit 15, a microprocessor unit (MPU) 50 for controlling the abovementioned units, and a hard disk unit 17. The tablet is of an electromagnetic induction type. More specifically, a high-frequency current flows through a coil incorporated in the stylus pen 81, and a voltage induced by the current in the tablet 73 is processed to obtain the position of the stylus pen 81. In a handwriting input mode, a handwritten character written on the tablet 74 using the stylus pen 81 is output from the tablet 73 as x- and y-coordinate data, and the data are stored in the RAM 8 via the tablet controller 71. The MPU 50 recognizes a pattern using a pattern expressed by the x- and y-coordinate data stored in the RAM 8, a standard pattern prestored in the ROM 9, and a dictionary by, e.g., a composite similarity method, and stores the recognized character in a VRAM 57. Thereafter, the MPU 50 causes the LCD 59 to display the recognized character via the LCD controller 53.

Figure 3:
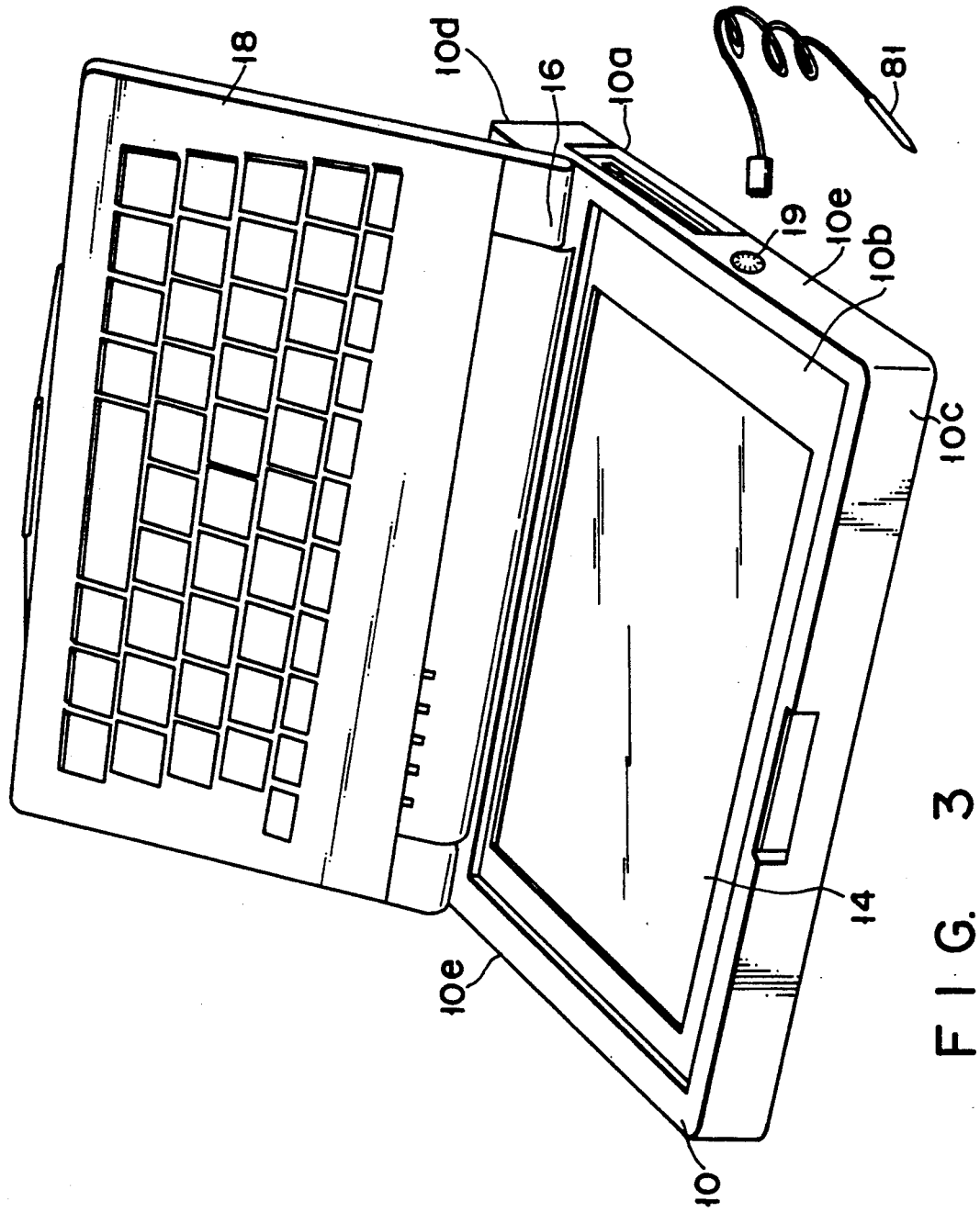
FIG. 3 is a perspective view showing the installation state of an integral type hand write input/display device of a work station according to an embodiment of the present invention, when the input/display device is used (in the hand writing input mode)
Figure 4:
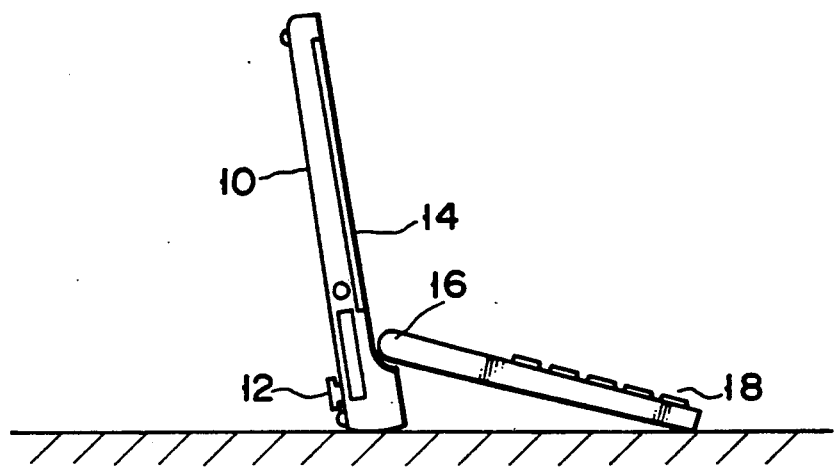
FIG. 4 is a side view showing the installation state of the work station when the keyboard is used (in the keyboard input mode)
Figure 5:
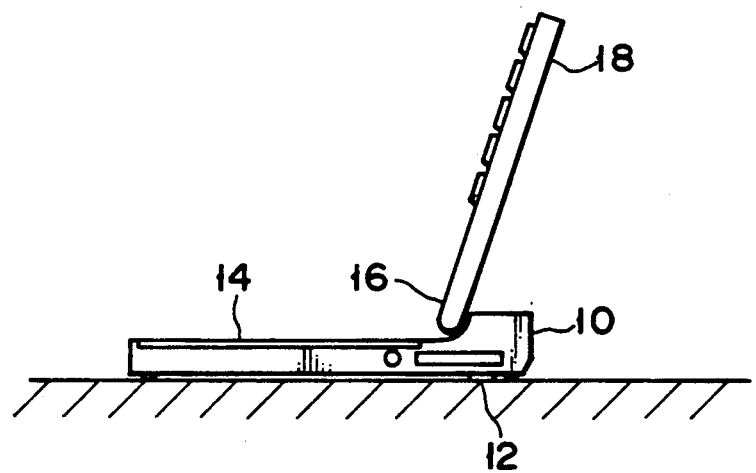
FIG. 5 is a side view showing the installation state of the work station in the hand writing input mode.

FIG. 3 is a perspective view showing the external appearance of an information processor (work station) according to this embodiment. FIG. 3 shows the installation state of the work station when data input is performed by using an integral type hand writing input/display device 14 (described later) (hereinafter called "hand writing input mode"). FIG. 4 is a side view showing the installation state of the work station when data input is performed by using a keyboard 18 (described later) (hereinafter called "keyboard input mode"). FIG. 5 is a side view showing the installation state of the work station when data is input by means of the integral type hand writing input/display device 14.

In FIGS. 3 through 5, a work station body 10 contains various functional parts such as a MPU 50, memory 8,57, hard-disk drive (HDD) 17, floppy-disc drive (FDD) 15, etc. An attitude sensor 12 is provided at a bottom portion 10a of the body 10. The switch of the sensor 12 is opened (turned off) in the position shown in FIG. 4, and it is depressed (turned on) in the position shown in FIG. 5. The detailed structure of the attitude sensor 12 and the details of the internal processing associated with the switch operation will be described later.

A top portion 10b of the body 10 is provided with the integral type hand writing input/display device 14. The device 14 has transparent tablets integrally superimposed on each other for coordinate data input on a liquid-crystal display (LCD). Regarding the input/display device 14, a desired location on the transparent tablets is pointed to by means of a pencil and the coordinate data corresponding to the location is input. The methods of inputting the coordinate data include an electromagnetic induction method, an electrostatic coupling method, a pressure sensitive method, etc. In this embodiment, the electromagnetic induction method is adopted. The transparent tablets will be described in detail in connection with the third embodiment of the invention.

A known hinge mechanism 16 (rotary support mechanism) is provided on a top portion 10b of the body 10, between a front end portion 10c of the body 10 and a rear end portion 10d of the body 10. The hinge mechanism 16 is rotatable between a position where the display surface of the integral type hand writing input/display device 14 and the surface of the keyboard are superimposed on each other (the closed position of the keyboard 18) and a position where the display surface of the input/display device 14 is rotated away from the surface of the keyboard to a predetermined degree. The hinge mechanism 16 can support the keyboard 18 at the opened state at a desired angle and can keep the keyboard in the state shown in FIG. 4.

A side portion 10e of the body 10 is provided with various connectors 19 such as a floppy-disc (FD) insertion hole, an RS232C connector, and connectors with a keyboard (numeric keys) and a stylus pen 81. The connectors 19 serve as an interface between the functional elements in the body 10 and external devices.

A specific method of working the apparatus of this embodiment and the internal operation of the apparatus will now be described.

Figure 6:
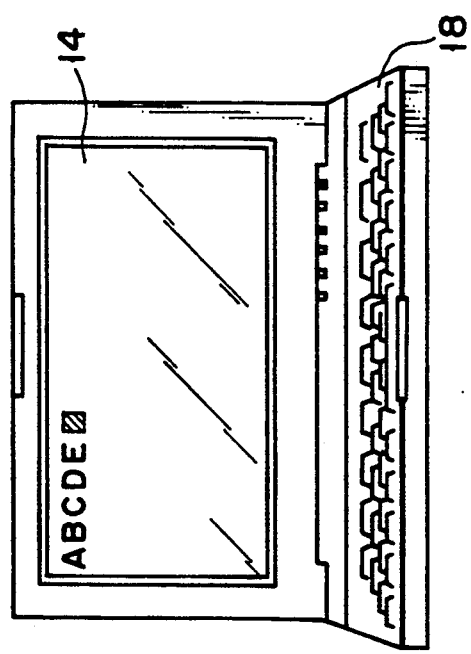
FIG. 6 is a front view of the work station in the keyboard input mode.

First, the method of installing the computer such as a work station in the keyboard input mode will be described. In this case, the work station is installed, as shown in FIG. 4. The work station is situated such that the body 10 is erected and supported by the rear end portion 10d of the body 10 and the upper end (opposite to the hinge mechanism 16) of the keyboard 18. The position of the work station is fixed since the hinge mechanism 16 supports the keyboard 18 at a desired open angle. The hinge mechanism 16 is positioned so that a desirable angle is set between the desk (on which the work station is installed) and the keyboard 18 for easy data input, in the state shown in FIG. 4. FIG. 6 shows an example of the display image when a document is produced by a word processing function in the keyboard input mode.

Figure 7:
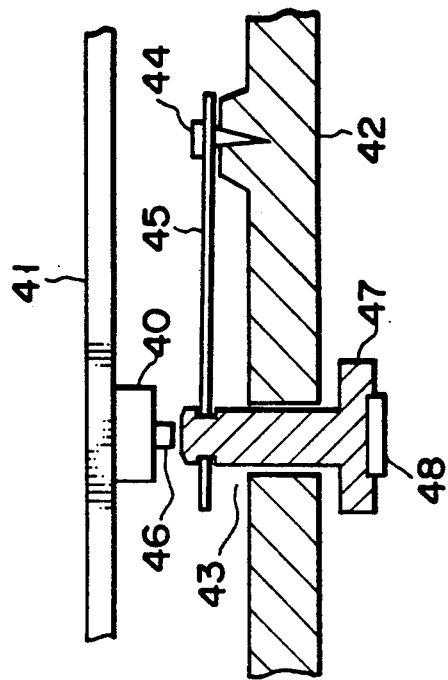
FIGS. 7 and 9 are cross-sectional views showing a detailed structure of a leg with a switch.

The attitude sensor 12 provided at the bottom portion 10a of the body 10 is in the "OFF" state. FIG. 7 shows a detailed structure of the attitude sensor 12 in its "OFF" state. In this embodiment, the attitude sensor 12 is in a form of a switching leg.

A switch 40, which is actually turned on/off, is provided on a printed circuit board (on the bottom portion (10a) side) in the body 10. A movable insulator member 43, which corresponds to the leg 12 and passes through the hole in a body casing 42, is urged towards the outside of the casing 42 by means of a spring 45 fixed at the casing 42 by, e.g., a screw 44. Thus, a movable portion 46 of the switch 40 is slightly distanced from the movable insulator member 43 ("OFF" state).

Figure 9:
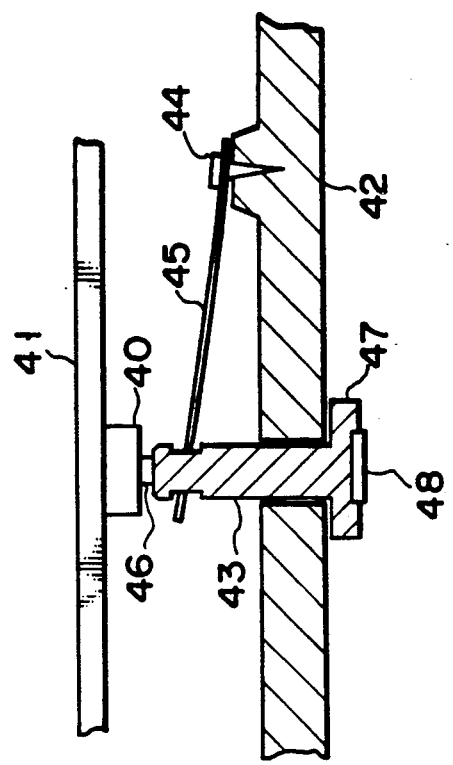
Figure 8:
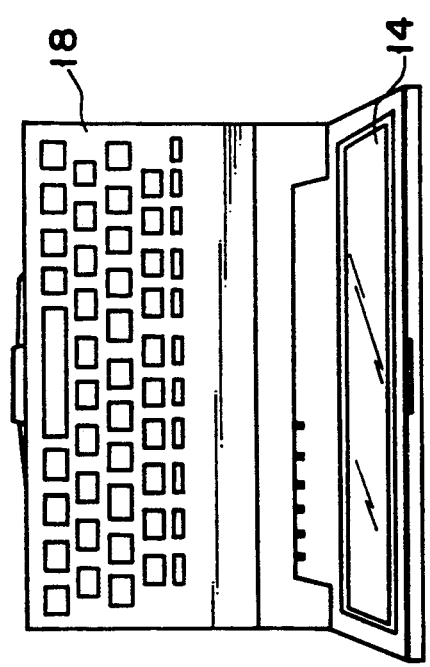
FIG. 8 is a front view of the work station in the hand writing input mode.

The method of situating the work station in the hand writing input mode will now be described. In this case, the work station is installed, as shown in FIG. 5. As shown in FIG. 5, the bottom portion 10a of the body 10 faces the surface of the desk. The attitude sensor 12 is rendered "ON". FIG. 9 shows a detailed structure of the attitude sensor 12 in its "ON" state.

When the work station is situated, as shown in FIG. 5, in order to write data by hand by use of the integral hand writing input/display device 14, the movable insulator member 43 of the attitude sensor 12 is pushed towards the switch 40 by the weight of the work station against the force of the spring 45. FIG. 9 shows the actual state of the attitude sensor 12. The movable insulator member 43 pushes the movable portion 46 of the switch 40 and turns on the switch 40. In this case, the weight of the apparatus is applied from the body casing 42 to a rubber 48 and the desk surface via a flange 47 of the movable insulator member 43. Thus, no excessive force is applied to the movable portion 46 of the switch 40.

Figure 10:
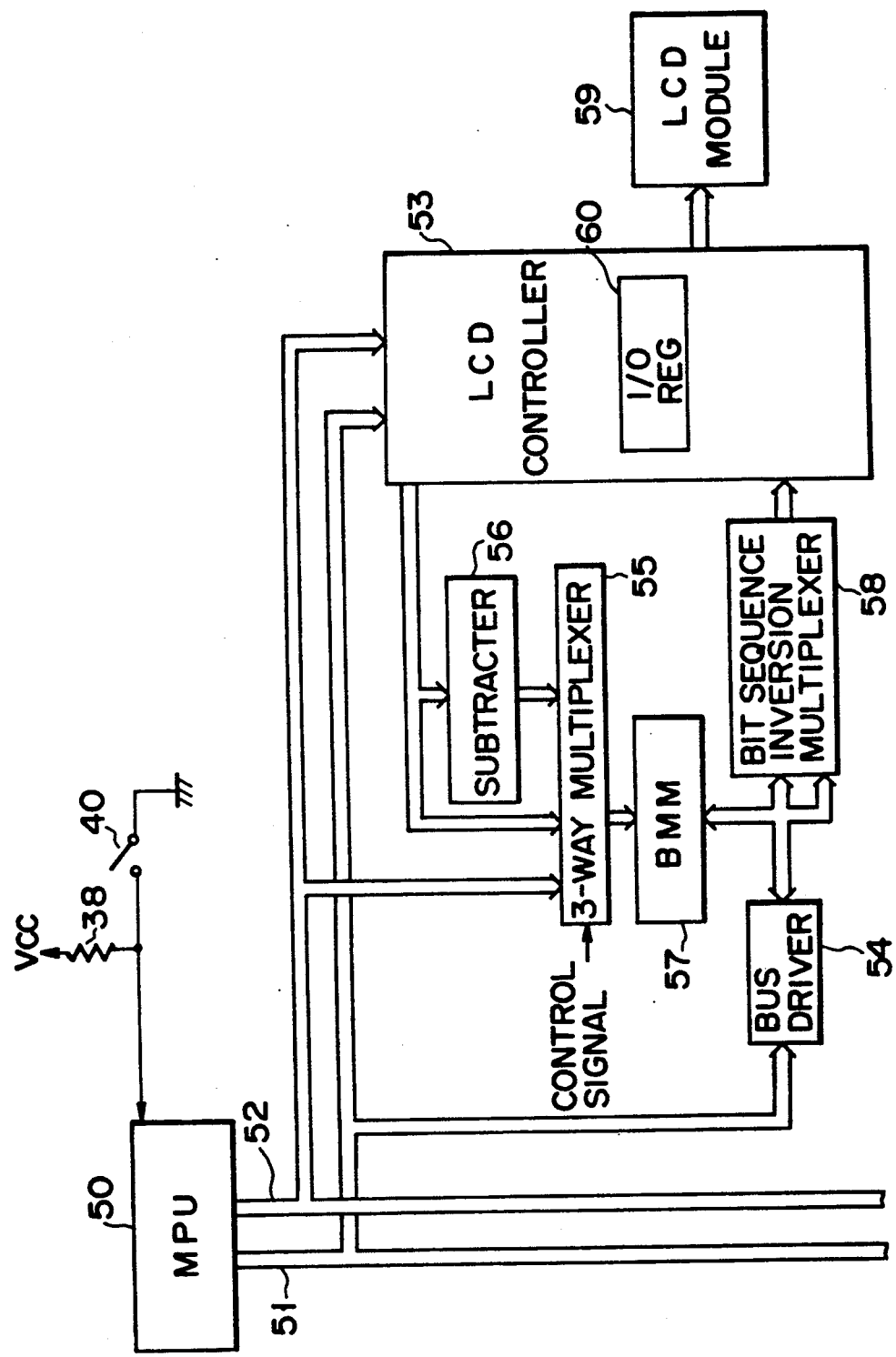
FIG. 10 is a block diagram showing an example of the structure of a display circuit for controlling the display of an LCD display.

The ON or OFF state of the switch 40 is directly supplied to the MPU 50 through a pull-up resistor 38 as shown in FIG. 10. The MPU 50 controls the input/display device 14 to reverse the display image in accordance with the ON/OFF state of the switch 40. FIG. 10 is a block diagram showing an example of the structure of a display circuit for reversing the display image. FIG. 10 is a detailed block diagram showing the LCD controller 53 and its peripheries. Referring to FIG. 10, a data bus 51 and an address bus 52 are connected to the MPU 50 for controlling the whole apparatus. The data bus 51 is connected to an LCD controller 53 and a bus driver 54. The address bus 52 is connected to the LCD controller 53 and an input terminal of a 3-way multiplexer 55. The address data fed to the LCD controller 53 functions to access an I/O register 60 provided within the LCD controller 53. Only part of the bits of the address data is used to access an I/O address. The other two input terminals of the 3-way multiplexer 55 are connected to an address bus extending through the LCD controller 53 and a subtracter 56. The output terminal of the 3-way multiplexer 55 is connected to a bit map memory (BMM) 57. The BMM 57 stores display data relating to the contents to be displayed, which are read/written in accordance with the data from the bus driver 54 and the 3-way multiplexer 55. The BMM 57 and bus driver 54 are connected to a bit sequence inversion multiplexer 58. The output terminal of the bit sequence inversion multiplexer 58 is connected to the LCD controller 53. The display data stored in the BMM 57 is transferred to the LCD controller 53 through the bit sequence inversion multiplexer 58. On the basis of the display data, the LCD controller 53 drives an LCD display module 59.

The BMM 57 is addressed in an 8-bit parallel mode, and addresses (0 to (nm−1) corresponding to a screen (8n dots in a horizontal line; m dots in a vertical line) are used in the BMM 57. The subtracter 56 receives an address a and outputs (nm−a−1).

The 3-way multiplexer 55 responds to a control signal supplied from the MPU 50 in the following manner. When the MPU 50 accesses the BMM 57, the 3-way multiplexer 55 selects address data from the address bus 52. When the LCD controller 53 drives and controls the LCD display module 59, the 3-way multiplexer 55 selects address data from the subtracter 56 or address data from the LCD controller 53, depending on whether the MPU 50 commands vertical/horizontal inversion (i.e., whether inversion command control data has been provided). The MPU 50 may be designed to write its control data in one of the I/O registers 60 within the LCD controller 53, or a flip-flop which can be controlled by the MPU may be provided. The MPU issues an inversion command in accordance with the ON/OFF state of the switch 40 of the attitude sensor 12. The bit sequence inversion multiplexer 58 may output the input 8 bits as they are, or may output the input 8 bits by reversing the order of the input 8 bits (0→7, 1→6, . . . , 7→0).

For example, in the case where the LCD display module 59 has a resolution of 640 dots×400 dots, the contents of addresses 0 to 79 of the BMM 57 correspond to the highest row of the screen, and the addresses 80×400−1=31999 correspond to the lower right part of the screen. In order to invert the display contents vertically and horizontally, the address 31999 is substituted for the address 0 when the 8-dot contents of the upper left part of the screen are read from the BMM 57, and the address 31998, in place of the address 0, is read. That is, in the subtracter 56, (32000−A−1) is found in connection with the address a fed from the LCD controller 53 to the BMM 57. Where the display contents are inverted vertically and horizontally and are displayed, the output from the subtracter 56 is selected by the 3-way multiplexer 55.

In this embodiment, the BMM 57 has a 8 bit/word construction, and the 8 bits corresponding to the horizontally aligned 8 dots on the screen can be simultaneously read out. Accordingly, even if the addresses in the 3-way multiplexer 55 are inverted, the order of the 8 bits cannot be inverted. Thus, the bit order of the 8 bits, which are read out in parallel, is inverted by means of the bit sequence inversion multiplexer 58, thereby realizing the inverted display.

Figure 11:
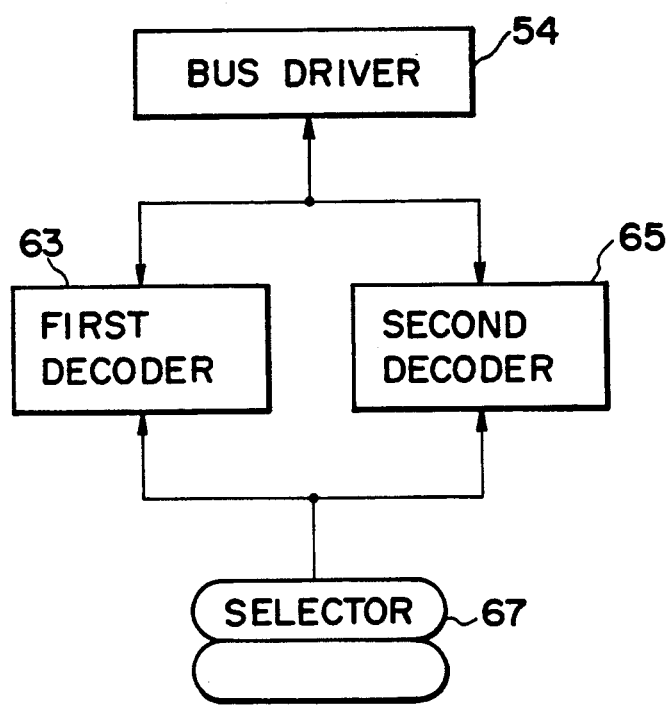
FIG. 11 is a detailed block diagram of a bit sequence inversion multiplexer in FIG. 10.

FIG. 11 shows a detailed block diagram of the bit sequence inversion multiplexer 58. First and second decoders 63 and 65 are connected to the bus driver 54. The first decoder 63 outputs a display pattern as a normal data string. The second decoder 65 outputs data while replacing its upper and lower bits. The selector 67 controls whether normal data or replacement data is to be output.

Figure 12:
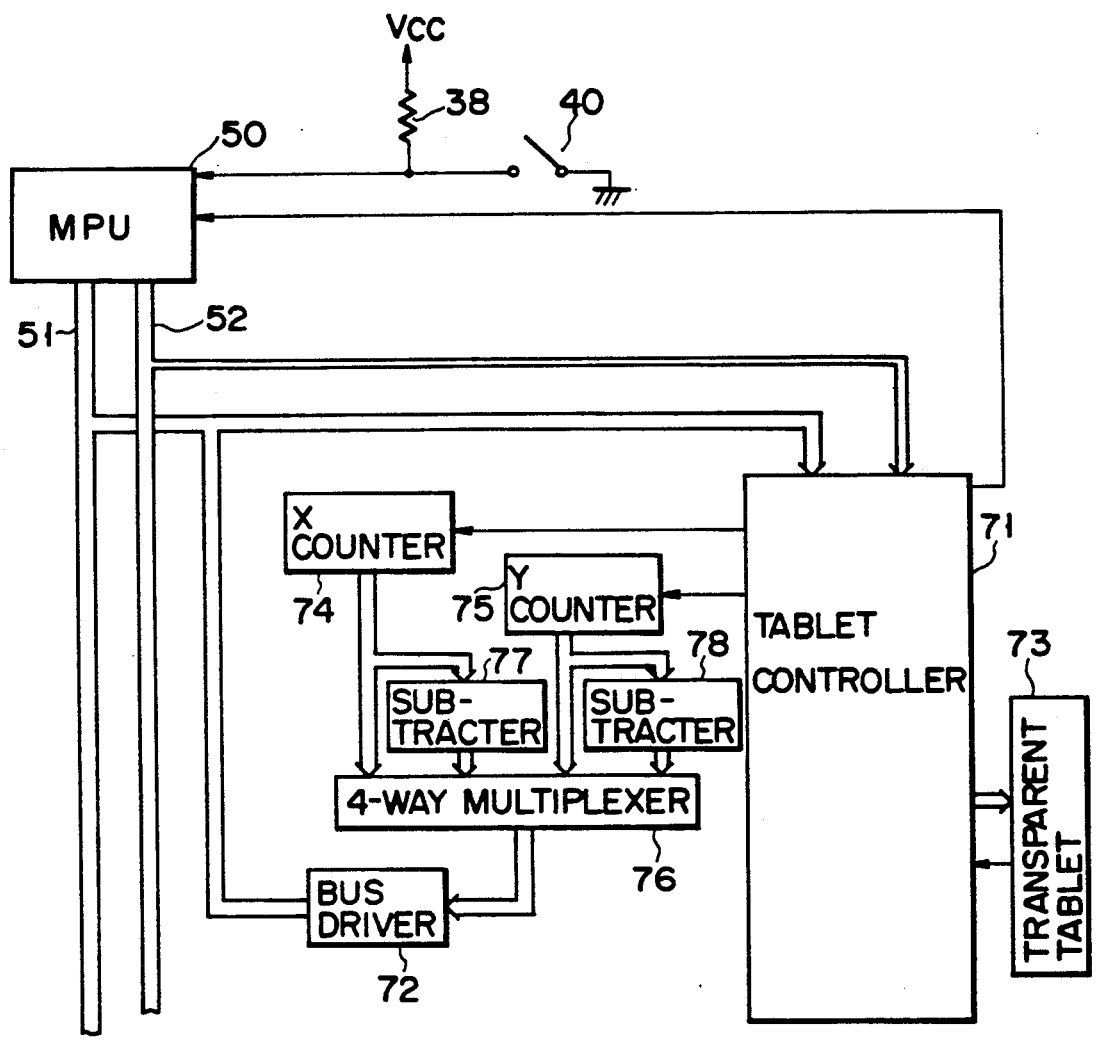
FIG. 12 is a block diagram showing an example of the structure of a coordinate input circuit for controlling the coordinate data input of transparent tablets.

On the other hand, one point on the transparent tablet of the integral type hand writing input/display device 14 is indicated by use of a pencil, thereby reading the coordinate data representing the location of the point. The coordinate data, too, must be converted when the display contents are inverted vertically and horizontally. The MPU performs the conversion operation of the indicated location on the tablet, depending on the ON/OFF state of the switch 40 of the attitude sensor 12. FIG. 12 is a block diagram showing an example of the structure of a coordinate input circuit for performing the conversion operation. In principle, the operation of the this coordinate input circuit is similar to that of the display circuit shown in FIG. 10. In the case of the display circuit of FIG. 10, the BMM 57 employs the addresses obtained by converting two-dimensional addresses to one-dimensional addresses. By contrast, in the case of the coordinate input circuit of FIG. 12, the two-dimensional addresses are used as they are.

In FIG. 12, the data bus 51 is connected to a tablet controller 71 and a bus driver 72. The address bus 52 is connected to the tablet controller 71. The tablet controller 71 is connected to a transparent tablet 73. The transparent tablet 7 is controlled by the tablet controller 71 to successively scan the screen (matrix of tablet), for example, electromagnetically, first, in the X-direction, and secondly in the Y-direction. A scan signal sensed by a pen 81 is fed back to the tablet controller 71. The tablet controller 71 is connected to an X-counter 74 and a Y-counter 75. The tablet controller 71 resets the X-counter 74 and the Y-counter 75 in synchronism with the scan of the transparent tablet 73. The tablet controller 71 processes the sensed signal fed back from the transparent tablet 73, and stops the counting of the X-counter 74 and Y-counter 75 at the location corresponding to the pen position. When the X-and Y-scan has been finished, the tablet controller 71 sends an interrupt signal to the MPU 50. The X-counter 74 and Y-counter 75 output count values to an input terminal of a 4-way multiplexer 76. The other two input terminals of the 4-way multiplexer 76 are connected to buses extending from the X-counter 74 and Y-counter 75 via subtracters 77 and 78 associated with the X-counter 74 and Y-counter 75. Suppose that, when the matrix of the transparent tablet 73 is 8n dots in a horizontal line and m dots in a vertical line (identical to the resolution of the LCD display), the output from the X-counter 74 (the input to the subtracter 77) is X and the output from the Y-counter 75 (the input to the subtracter 78) is y. In this case, the subtracter 77 outputs $(n-x-1)$, and the subtracter 78 outputs $(m-y-1)$. In accordance with the control data for commanding the vertical/horizontal inversion, the 4-way multiplexer 76 selects and outputs one of address data from the X-counter 74 and Y-counter 75 and address data from the subtracters 77 and 78. The MPU 50 reads the contents of the X-counter 74 and Y-counter 75 through the data bus 51, thereby recognizing the location indicated by the pen. Thereafter, the MPU 50 issues a command to the tablet controller 71 and repeats the above-described processing. In this manner, the coordinate position pointed by the pen 81 is inverted in accordance with the inverted display of the LCD display of the integral type hand writing input/display device 14.

Since the integral type hand writing input/display device 14 is provided on the top portion 10b of the body 10 and the input/display device 14 is freely rotatable relative to the keyboard 18 by means of the hinge mechanism 16, data can be input from either the input/display device 14 or the keyboard 18. That is, when the integral type hand writing input/display device 14 is used, the bottom portion 10a of the body 10 is situated on the desk, thus making it easy to write characters, etc. on the transparent tablet. When the keyboard 18 is used, the apparatus is supported by the rear end portion 10d of the body 10 and the end portion (in the opened state) of the keyboard 18, as shown in FIG. 4. Thus, data can be easily input from the keyboard 18, and the display screen of the input/display device 14 can be situated in the desirable position for visual recognition.

When the apparatus is not used, it can be locked with the keyboard 18 closed. Thus, the apparatus can be easily carried, compared to the conventional system wherein a keyboard is connected. Since the integral type hand writing input/display device 14 and the keyboard 18 are locked in the state wherein they face each other, the display surface of the input/display device 14 can be protected.

By changing the installation state of the apparatus (i.e., changing the input means to be used), the switching state (ON/OFF) of the attitude sensor 12 is changed. Thus, the display screen is set (inversion display) and the coordinate location input by the input/display device 14 is converted.

In this embodiment, the data relating to the selection of the integral type hand writing input/display device 14 or the keyboard 18 is delivered to the MPU 50 on the basis of the ON/OFF state of the attitude sensor 12 provided at the bottom portion 10a of the body 10. However, other system may be adopted. For example, taking advantage of the fact that the attitude of the body varies in accordance with the input means to be used (input/display device 14 or keyboard 18), an attitude sensor is provided within the body to discriminate the input means to be used. Alternatively, it is possible to provide an exclusive switch for input means indication, which can be manually turned on/off.

In this embodiment, when data is input by means of the keyboard 18, no data is input by means of the integral type hand writing input/display device 14. However, in other embodiments, both may be used at a same time.

A second embodiment of the present invention will now be described with reference to FIGS. 13 through 16. In the first embodiment, the attitude sensor 12 is a microswitch. In the second embodiment, however, the attitude sensor 12 is achieved by sealing mercury 33 in a spherical or cylindrical glass container 31. The glass container 31 is fixed within the body 10. In the case of cylindrical glass container 31, the axis of the container 31 is substantially aligned with the axis of the hinge mechanism 16. Two electrodes 35 and 37 are penetrated through the wall of the container 31. The electrodes 35 and 37 are so distanced that both electrodes are put in contact with mercury 33 (i.e., electrically connected) when the mercury 33 is situated on the bottom of the container 31 by the gravity while both electrodes are located at the lower part of the container 31. The attitude sensor 12 is constituted at a very low cost if the "ON" attitude range of electrodes is designed to be much narrower than the "OFF" attitude range.

When the work station is installed in the position shown in FIG. 13, the two electrodes 35 and 37 are arranged vertically (on the side portion of the glass container 31), as shown in FIG. 14. The electrodes 35 and 37 are separated from the mercury on the bottom of the glass container 31. In other words, the electrodes 35 and 37 are opened ("OFF").

When the work station is installed in the position shown in FIG. 15 in order to input hand written data with use of the integral type hand writing input/display device 14, the two electrodes 35 and 37 are arranged horizontally (on the lower portion of the glass container 31), as shown in FIG. 16. Thus, the electrodes 35 and 37 are put in contact with the mercury on the bottom of the container 31 and the electrodes 35 and 37 are closed ("ON").

The ON/OFF state of the attitude sensor 12 is read by the MPU 50 in the work station. In accordance with the ON/OFF state, the MPU carries out the control to invert the display of the integral hand writing input/display device 14. The display inversion control is similar to that in the first embodiment, and a description thereof is omitted.

In this embodiment, the data relating to the selection of the integral type hand writing input/display device 14 or the keyboard 18 is delivered to the MPU on the basis of the ON/OFF state of the attitude sensor 13 shown in FIGS. 14 and 16. The structure of the attitude sensor 13 may be modified.

In this embodiment, when data is input by means of the keyboard 18, no data is input by means of the integral type hand writing input/display device 14. However, in other embodiments, both may be used at a same time.

Figure 17:
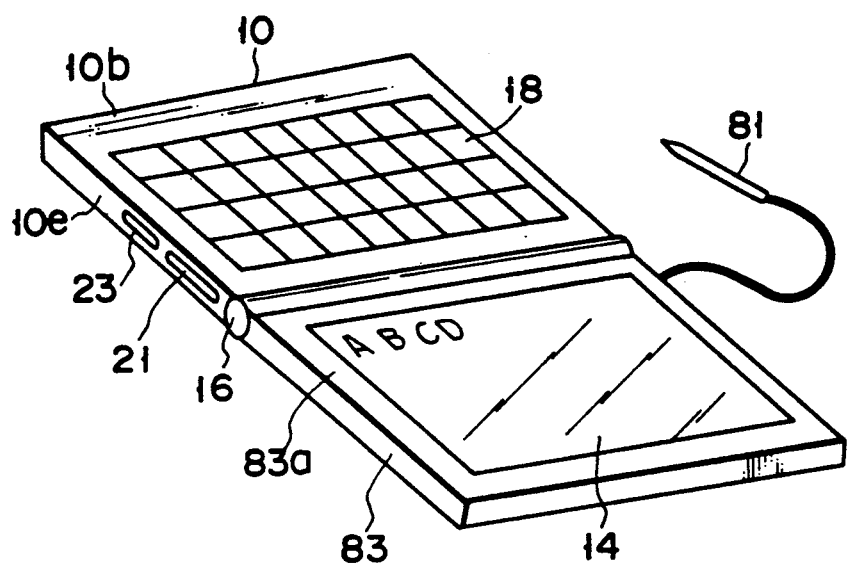
FIG. 17 shows the installation state of the work station in the hand writing input mode of a third embodiment.
Figure 18:
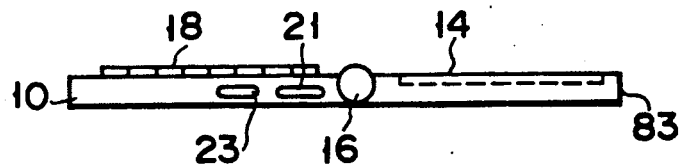
FIG. 18 a side view of the work station shown in FIG. 17.
Figure 19:
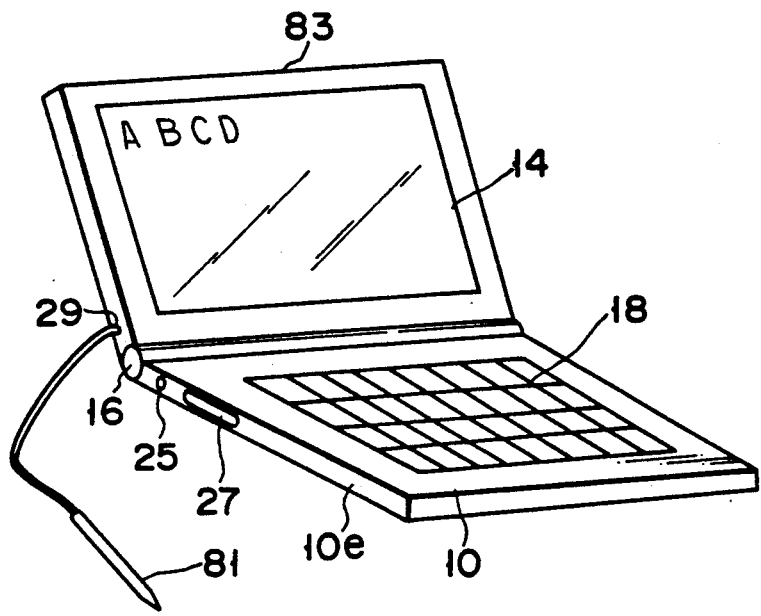
FIG. 19 is a perspective view showing the installation state of the work station in the keyboard input mode of the third embodiment.
Figure 20:
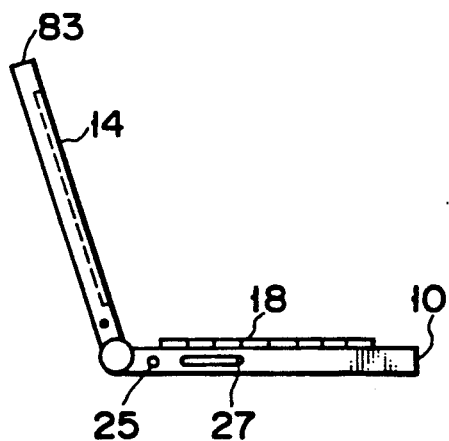
FIG. 20 is a side view of the work station shown in FIG. 19.

A third embodiment of the invention will now be described with reference to FIGS. 17 through 27. FIG. 18 shows the outer structure of an information processor according to the third embodiment. FIG. 17 shows the installation state of the information processor in the case of inputting data by using the integral type hand writing input/display device 14. FIG. 18 is a side view of the information processor shown in FIG. 17. FIG. 19 is a perspective view showing the installation state of the information processor by using the keyboard 18. FIG. 20 is a side view of the information processor shown in FIG. 19.

Referring to FIGS. 17 through 20, a body 10 stores, in its casing, functional parts such as a microprocessor (MPU) 50, a memory, a hard-disc drive (HDD), a floppy-disc drive (FDD), and an IC card interface. A keyboard 18 is provided on a top portion 10a (in FIG. 17) of the body 10. A side portion 10b of the casing is provided with an interface section for interface between the functional parts stored in the casing body and external devices. Specifically the side portion 10b is provided with various connectors 27 such as an FD insertion hole 21, an IC card insertion hole 23, a power cord adapter 25 and an RS-232C connector. Further provided is a terminal 29 to which a stylus pen 81 is connected. The stylus pen 81 is used to point a location on a transparent tablet when data is input from the integral type hand writing input/display device 14.

A display/input unit 83 contains the integral type hand writing input/display device 14. The input/display device 14 is constructed such that the top portion 83a of the display/input unit 83 (in FIG. 17) serves as a display surface.

A hinge portion (rotary support mechanism) 16 functions to couple the body 10 and the display/input unit 83. As is shown in FIG. 21, the hinge portion 16 is rotatable over a predetermined opening angle from the position where the display surface of the integral type hand writing input/display device 14 and the keyboard 18 face each other (i.e., the closed state of the keyboard 18). The hinge portion 16 can hold the keyboard 18 and the input/display device 14 at a desired opening angle. An opening angle detecting mechanism (described later) for detecting the opening angle is provided within the hinge portion 16.

The integral type hand writing input/display device 14 will now be described. The input/display device 14 is constructed by integrally superimposing a transparent tablet 73 for coordinate input on the display surface of, e.g., a flat liquid-crystal display (LCD). The tablet 73 is provided with a coordinate surface having the same size as the display surface of the LCD. The information displayed on the display section can be recognized through the transparent tablet 73.

As is shown in FIG. 22, for example, the transparent tablet 73 is fabricated by coupling a pair of transparent glass plates 73a and 73b, with an insulating protection film (not shown) interposed therebetween. On one side surface of each of the transparent glass plates 73a and 73b, a plurality of strip-like transparent electrodes 73c (73d) are arranged in parallel with a predetermined interval. The glass plates 73a and 73b are cross at right angles. The transparent electrodes 73c and 73d of the whole tablet are electromagnetically scanned by a tablet controller 71 (described later).

Data input is effected by pointing to a location on the surface of the transparent tablet 73 by means of the stylus pen 81. For example, when characters, etc. are written on the tablet 73 by the stylus pen 81, the data representing the strokes of the written characters, etc. is input as a sequence of the locations pointed by the stylus pen 81, that is, a coordinate data sequence of the pointed locations.

In accordance with the location coordinate sequence representing the written input characters, etc., the same coordinates on the LCD is driven. By the display control, the characters written on the surface of the transparent tablet are simultaneously displayed as loci of written strokes. The character data is input, as if characters were written on a paper sheet by the stylus pen 81.

The hinge portion 16 will now be described in detail.

Figure 23:
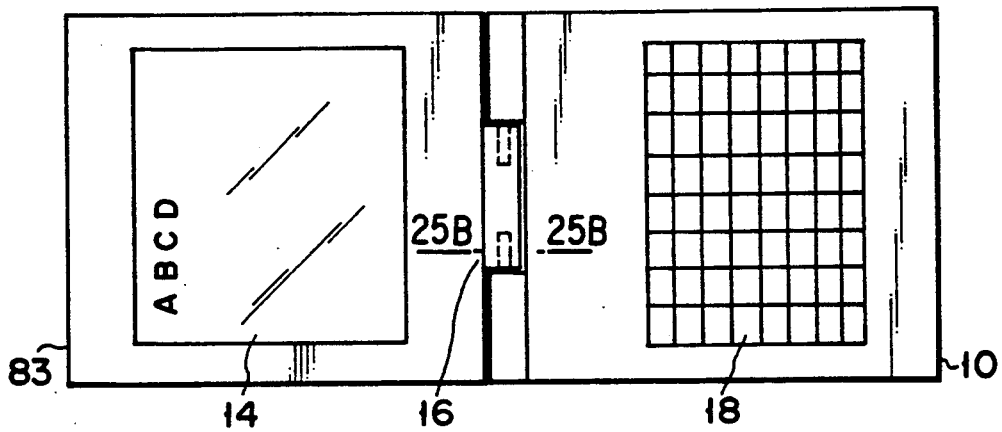
FIG. 23 is a plan view of the work station in the hand writing input mode of the third embodiment.
Figure 24:
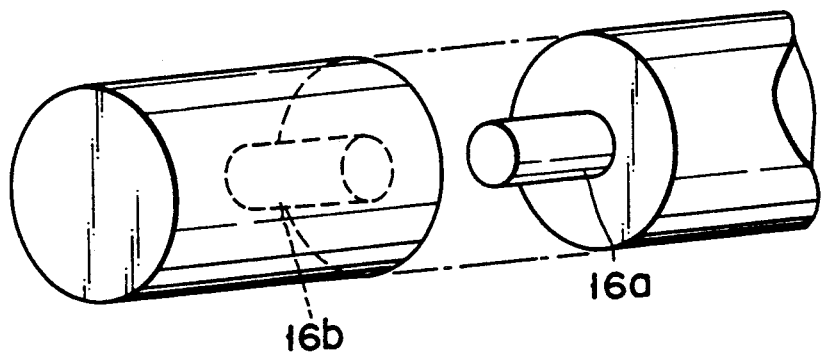
FIG. 24 is a partially enlarged view showing the structure of a hinge portion of the third embodiment.

FIG. 23 is a plan view showing the keyboard 18 and the integral type hand writing input/display device 14 in the state wherein they are opened about 180° (in the hand writing input mode). FIG. 24 is an enlarged view of the connection area of the body (10) side portion and the display/input unit (83) side portion of the hinge portion 16. As is shown in FIGS. 23 and 24, a center shaft 16a of the hinge is provided on the body (10) side portion of the hinge portion 16, and a receiving portion 16b is provided on the display/input unit (83) side portion. The shaft 16a enters the receiving portion 16b with a predetermined frictional force, whereby the keyboard 18 and the input/display device 14 can be held at a desired opening angle.

Figure 25A:
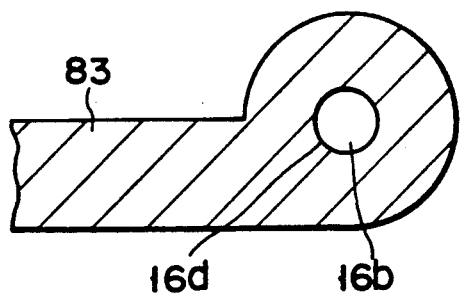
FIGS. 25A and 25B are cross-sectional views of the hinge portion, taken along line A—A in FIG. 23.
Figure 25B:
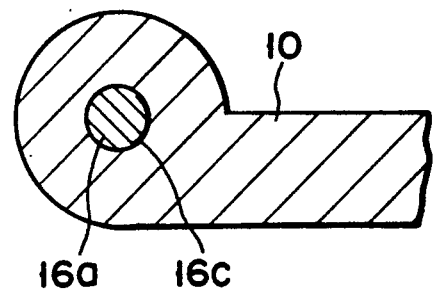

FIGS. 25A and 25B are cross-sectional views of the body (10) side portion (FIG. 25B) and the display/input unit (83) side portion (FIG. 25A) of the hinge portion 16, taken along line A—A in FIG. 23. As is shown in FIGS. 25A and 25B, the hinge portion 16 is provided with an opening angle detecting mechanism. Specifically, electrical conductors 16c and 16d are provided at a predetermined location on the outer periphery of the shaft 16a and at a predetermined location on the wall of the receiving portion 16b which is put in contact with the shaft 16a. The electrical conductors 16c and 16d on the shaft 16a and receiving portion 16b do not contact each other when the keyboard 18 and the input/display device 14 are opened about 180°, as shown in FIGS. 17 and 18. However, the conductors 16c and 16d contact each other when the keyboard 18 and device 14 are opened at a predetermined range of angles (e.g., about 135°), as shown in FIGS. 19 and 20.

More specifically, in the hand writing input mode, the electrical conductors 16c and 16d of the opening angle detecting mechanism do not contact each other, as shown in FIG. 26. In the keyboard input mode, they contact each other, as shown in FIG. 27. The contact state of the conductors 16c and 17d is detected by an opening angle detecting mechanism controller (not shown), and the detected result is sent to the MPU 50. Like in the first embodiment, the MPU 50 commands the inversion of the display contents of the integral type hand writing input/display device 24 and the conversion of the input coordinate locations, in accordance with the detected result obtained by the opening angle detecting mechanism controller.

The method of using the information processor in this embodiment will now be described.

In the hand writing input mode, as shown in FIG. 17, the integral type hand writing input/display device 14 is situated on the user's side, and the keyboard 18 which is not to be used is turned down. Thus, the opening angle between the keyboard 18 and the input/display device 14 is set at about 180°. The opening angle detecting mechanism controller informs the MPU 50 of the hand writing input mode. The MPU 50 informs the display circuit and the coordinate input circuit of the control of the display contents and the coordinate input locations such that the hinge portion 16 side is situated upwards.

On the other hand, in the keyboard input mode, as shown in FIG. 19, the keyboard 18 is situated on the user's side, and the input/display 14 is set at a desired angle (about 135° or less) for easy recognition of the display surface. The opening angle detecting mechanism controller informs the MPU 50 of the keyboard input mode. The MPU 50 informs the display circuit and the coordinate input circuit of the inversion of the display contents and the conversion of the coordinate input locations such that the hinge portion 16 side is situated downwards. In this case, data can be input from not only the keyboard but also from the integral type hand writing input/display device 14.

By situating the apparatus in accordance with the data input mode, the display contents (inversion display) of the display device and the coordinate locations input by the input/display device 14 are inverted on the basis of the opening angle between the keyboard 18 and the input/display device 14. Thus, the user need not pay particular attention to the mode change.

The structure of the opening angle detecting mechanism is not limited to the above embodiment, and other structure may be employed. For example, the center shaft 16a and the receiving portion 16b may be arranged to form a variable capacitor 97. When the angle between the keyboard 18 and the input/display device 14 is within a predetermined value, the capacitance of the capacitor 97 is increased, and thus the voltage of the capacitor 97 is increased. This increased voltage is compared with a reference voltage $V_{ref}$ by a comparator 99. When the voltage of the capacitor 97 is larger than the reference voltage $V_{ref}$, it is determined that the angle between the keyboard 18 and the input/display device 14 is within a predetermined value, and when the capacitor voltage is smaller than the reference voltage, it is determined that the angle between the keyboard and the input/display unit 14 is set at about 180°.

A fourth embodiment of the present invention w 11 now be described with reference to FIGS. 28 through 33.

Figure 31:
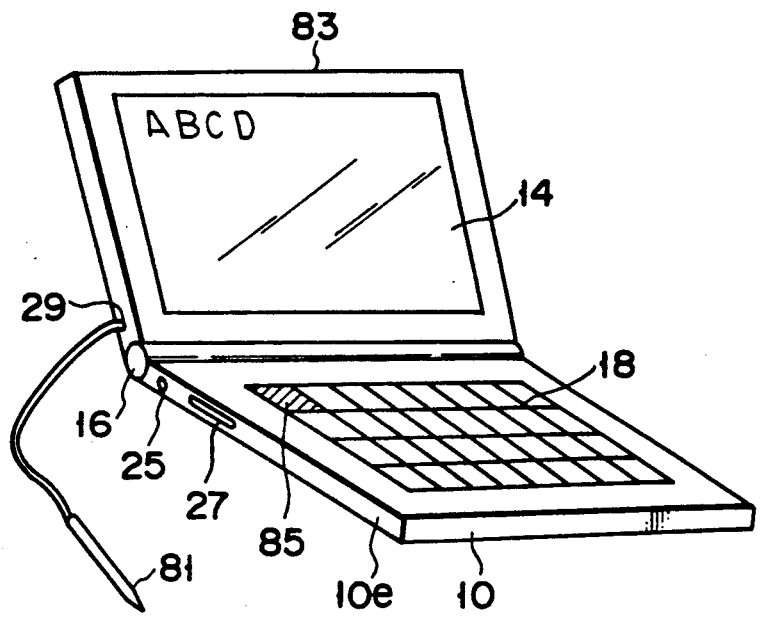
FIG. 31 a perspective view showing the installation state of the work station in the keyboard input mode of the fourth embodiment.
Figure 32:
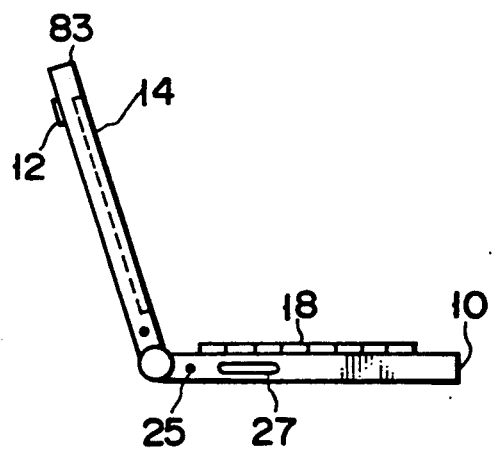
FIG. 32 is a side view of the work station shown in FIG. 31.

In the fourth embodiment, in addition to the attitude sensor 12 shown in FIGS. 29 and 31, the function keys includes "switch" key 85 for commanding the vertical inversion of the display contents on the screen, and the change of the display contents on the input/display device 14 and the detection locations of input coordinate data (described later), as shown in FIGS. 28 and 30.

In this embodiment, the display contents of the display device and the coordinate locations input by the input/display device 14 can be set in accordance with the situation of the compute when it is powered. Accordingly, a user is not required to intentionally designate the initial settings. When a user wants to switch the mode during its operation, he can operate the switch key 85 to arbitrarily invert the display contents and the coordinate locations.

The signal for informing the MPU 50 of the ON/OFF state of the switch 40 is generated by the switch signal determining circuit shown in FIG. 33. The MPU 50 carries out the inversion command in response to the switch command input upon the depression of the "switch" key 85.

A signal for telling the ON/OFF state of the switch 40 to the MPU is generated by a switch signal determining circuit shown in FIG. 33. FIG. 33 is a block diagram showing an example of the switch signal determining circuit, and the structure of this circuit is not limited to this example. The data relating to the state of the switch is delivered to a data input terminal of a D-flip-flop 95, and an output signal of a power-on reset circuit 93 is supplied to a clock input terminal of the D-flip-flop 95. The output signal from the power-on reset circuit 93 is in the "LOW" state for a predetermined time period after the apparatus is powered on, and is brought to the "HIGH" state after a predetermined time period. When the reset is released, the output from the D-flip-flop 95 is fixed. B using this circuit, a switch signal representing the state of the switch 40 is fixed in accordance with the state of the integral type hand writing input/display device 14 at the time of power-on, and is read by the MPU 50.

When the mode is changed after power on, the display contents and coordinate input locations can be vertically inverted by the operation of the "switch" key 85. Specifically, when the "switch" key 85 is depressed, a switch command is sent to the MPU 50. The MPU 50 informs the display circuit and the coordinate input circuit of the execution of the vertical inversion control for the display contents and coordinate input locations.

As stated above, when the mode is changed after power on, the conversion of the display contents (inversion display) of the display device and the coordinate locations input by the integral type hand writing input/display device 14 optionally can be designated.

In the above embodiments, the integral type hand writing input/display device 14 of the electromagnetic induction type was employed. However, the input/display device 14 may be of the electrostatic coupling type or pressure sensitive type. In addition, in the integral type hand writing input/display device 14, not only the liquid-crystal displays (LCD) but also other flat display such as a plasma display can be used.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An information processing apparatus comprising:
   an apparatus body;
   an integral type hand writing input/display device, having a tablet device for coordinate input integrally superimposed on a display device, for inputting coordinate data representing a location indicated on the tablet device;
   a keyboard;
   a rotary support mechanism, provided on a top portion of the apparatus body, for rotating said integral type hand writing input/display device and said keyboard from a position, in which a display input surface of the integral type hand writing input/display device and a surface of the keyboard face each other, to a position of a desired opening angle, and for keeping the opening angle;
   attitude detecting means for detecting an attitude of the apparatus body, in accordance with an installation state of the apparatus body; and
   changing means for changing the display contents and coordinate data detection location of the integral type hand writing input/display device in accordance with the detection result of the attitude detecting means.

2. The information processing apparatus according to claim 1, wherein said attitude detecting means includes a switching leg provided on a bottom portion of the apparatus body, means for detecting the attitude in accordance with an ON/OFF state of the switching leg turned on when the weight of the apparatus body is applied to said switching leg.

3. The information processing apparatus according to claim 1, wherein said attitude detecting means is formed by sealing mercury in a container having therein at least two electrodes, and said attitude detecting means detects the attitude of the apparatus body, depending on whether the mercury, which moves relative to the electrodes in the container in accordance with the installation state of the processing apparatus body, electrically connects the electrodes.

4. The information processing apparatus according to claim 1, wherein said attitude detecting means detects the attitude upon application of the weight of the apparatus body to the attitude detecting means.

5. An information processing apparatus comprising:
   an integral type hand writing input/display device, having a tablet device for coordinate input integrally superimposed on a display device, for inputting coordinate data representing a location indicated on the tablet device;
   a keyboard;
   a rotary support mechanism for rotating said integral type hand writing input/display device and said keyboard from a position, in which a display input surface o the integral type hand writing input/display device and a surface of the keyboard face each other, to a position of a desired opening angle;
   an opening angle detecting means for detecting the opening angle of the rotary support mechanism; and
   changing means for changing the display contents of the display device and coordinate data detection location of the integral type hand writing input/display device in accordance with a detection result of the opening angle detecting means.

6. The information processing apparatus according to claim 5, wherein said rotary support mechanism is capable of holding the integral type hand writing input/display device and the keyboard at a desired opening angle.

7. The information processing apparatus according to claim 5, wherein said rotary support mechanism includes a hinge mechanism comprising a center shaft and a receiving portion, and said opening angle detecting means includes electrical conductors provided on the center shaft and the receiving portion of the hinge mechanism and means for detecting the opening angle in accordance with a conducting state of the conductor.

8. The information processing apparatus according to claim 5, wherein said rotary support mechanism includes a hinge mechanism comprising a center shaft and a receiving portion, and said opening angle detecting means includes a variable capacitor formed by the center shaft and the receiving portion and means for detecting the opening angle in accordance with a voltage change of the variable capacitor.

9. An information processing apparatus comprising:
   an integral type hand writing input/display device, having a tablet device for coordinate input integrally superimposed on a display device, for inputting coordinate data representing a location indicated on the tablet device;
   a keyboard;
   a rotary support mechanism for rotating said integral type hand writing input/display device and said keyboard from a position, in which a display input surface of the integral type hand writing input/display device and a surface of the keyboard face each other, to a position of a desired opening angle;
   commanding means for commanding a change of a display contents of the display device and coordinate data detection location in the integral type hand writing input/display device; and
   changing means for changing the display contents of the display device and coordinate data detection location, in response to a command from the commanding means.

10. An information processing apparatus comprising:
    an integral type hand writing input/display device, having a tablet device for coordinate input integrally superimposed on a display device, for inputting coordinate data representing a location indicated on the tablet device;
    a keyboard;
    a rotary support mechanism for rotating said integral type hand writing input/display device and said keyboard from a position, in which a display input surface of the integral type hand writing input/display device and a surface of the keyboard face each other, to a position of a desired opening angle;

attitude detecting means for detecting an attitude of an apparatus body, in accordance with an installation state of the apparatus body;

commanding means for commanding a change of a display contents of the display device and coordinate data detection location in the integral type hand writing input/display device; and direction determining means for determining a direction of the display contents of the integral type hand writing input/display device and coordinate data detection location, in accordance with a detection result obtained by the attitude detecting means.

* * * * *

UNITED STATES PATENT AND TRADEMARK OFFICE
CERTIFICATE OF CORRECTION

PATENT NO. : 5,202,844
DATED : April 13, 1993
INVENTOR(S) : Shizuo Kamio, et al.

It is certified that error appears in the above-indentified patent and that said Letters Patent is hereby corrected as shown below:

Claim 5, column 16, line 1, change "o" to --of--

Signed and Sealed this

Twenty-fourth Day of May, 1994

Attest:

BRUCE LEHMAN

Attesting Officer        Commissioner of Patents and Trademarks